US006676042B2

(12) United States Patent
Howlett, Jr. et al.

(10) Patent No.: US 6,676,042 B2
(45) Date of Patent: Jan. 13, 2004

(54) AIRBAG INFLATION NOZZLE ASSEMBLY

(75) Inventors: John J. Howlett, Jr., Hensley, AR (US); Thomas C. Keenan, Franklin, TN (US)

(73) Assignee: Illinois Tool Works Inc., Glenview, IL (US)

( * ) Notice: Subject to any disclaimer, the term of this patent is extended or adjusted under 35 U.S.C. 154(b) by 254 days.

(21) Appl. No.: 10/015,786

(22) Filed: Dec. 17, 2001

(65) Prior Publication Data

US 2003/0111554 A1 Jun. 19, 2003

(51) Int. Cl.[7] .............................. B05B 1/30; B05B 1/32; B05B 15/08
(52) U.S. Cl. .................... 239/569; 239/451; 239/587.1; 239/587.5; 239/537; 239/581.1
(58) Field of Search ................. 239/569, 579, 239/581.1, 581.2, 587.1, 587.2, 587.5, 587.6, 588, 537, 538, 451, 455, 456, 457, 458, 265.19, 539; 280/735, 736, 739, 742, 729

(56) References Cited

U.S. PATENT DOCUMENTS

| | | | | | |
|---|---|---|---|---|---|
| 3,741,584 A | * | 6/1973 | Arai | ............................ | 280/735 |
| 3,861,710 A | * | 1/1975 | Okubo | ........................ | 280/735 |
| 5,042,541 A | | 8/1991 | Krier et al. | | |
| 5,484,163 A | * | 1/1996 | Jenkins | ..................... | 280/728.2 |
| 5,742,983 A | * | 4/1998 | Lo | .......................... | 24/30.5 R |
| 5,772,238 A | * | 6/1998 | Breed et al. | ............. | 280/728.2 |
| 5,839,488 A | | 11/1998 | Peters | | |

* cited by examiner

*Primary Examiner*—Davis Hwu
(74) *Attorney, Agent, or Firm*—Schwartz & Weinrieb

(57) ABSTRACT

An airbag inflation nozzle assembly for fluidic mating with an inflation valve assembly, including an inflation valve stem, upon an inflatable cargo airbag comprises a housing, and an inflation nozzle member, having an inflation nozzle tip, pivotally mounted within the housing between a first position at which the inflation nozzle tip is fluidically disengaged from the inflation valve assembly, and a second position at which the inflation nozzle tip is fluidically engaged with the inflation valve assembly. A transversely oriented camming button is movably mounted upon the housing between an UNLOCKED position so as to permit the inflation nozzle member to be moved to the first fluidically disengaged position with respect to the valve assembly, and a LOCKED position which forces the inflation nozzle member to be moved to the second fluidically engaged position with respect to the valve assembly. The housing further comprises a pair of oppositely disposed side rails upon which a valve body portion of the valve assembly can be slidably supported as the housing of the inflation nozzle assembly is being operatively mated with the valve assembly, and an end wall flange portion for engaging a valve body member of the valve assembly during operative mounting of the housing upon the valve assembly so as to ensure coaxial alignment of the inflation nozzle tip with the inflation valve stem.

21 Claims, 4 Drawing Sheets

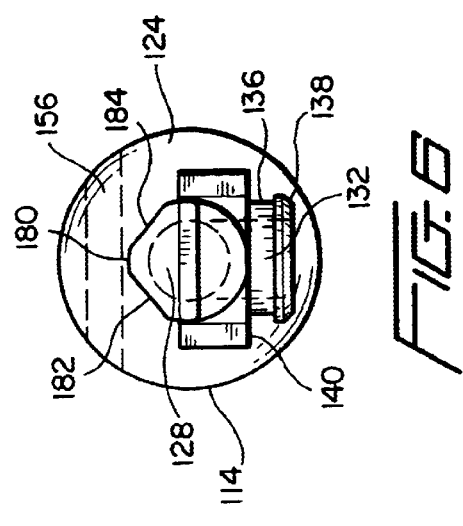
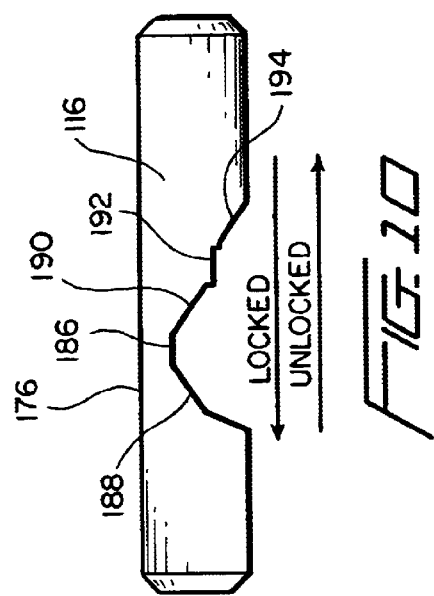
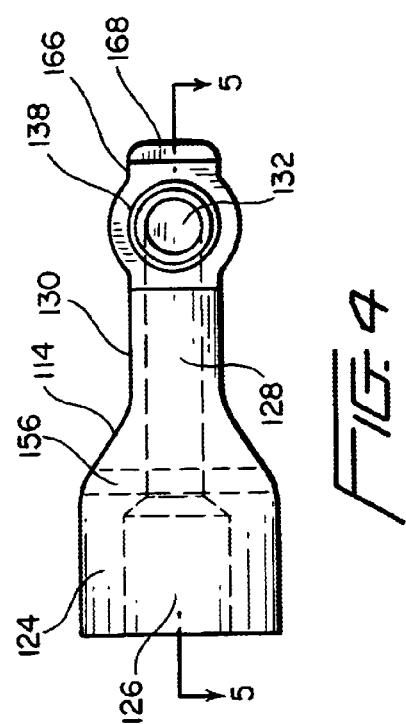
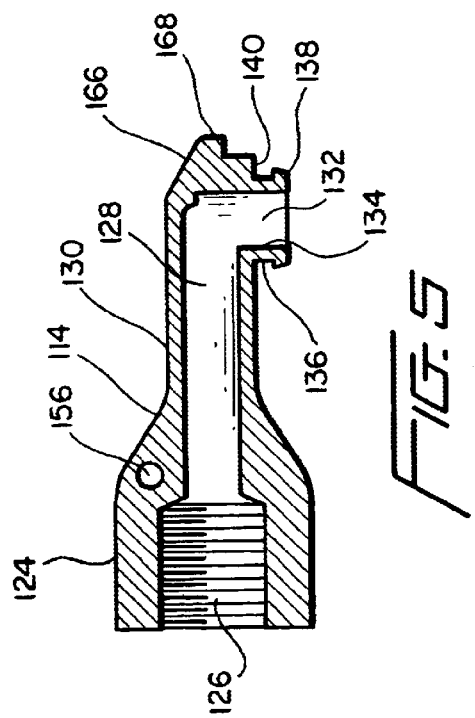

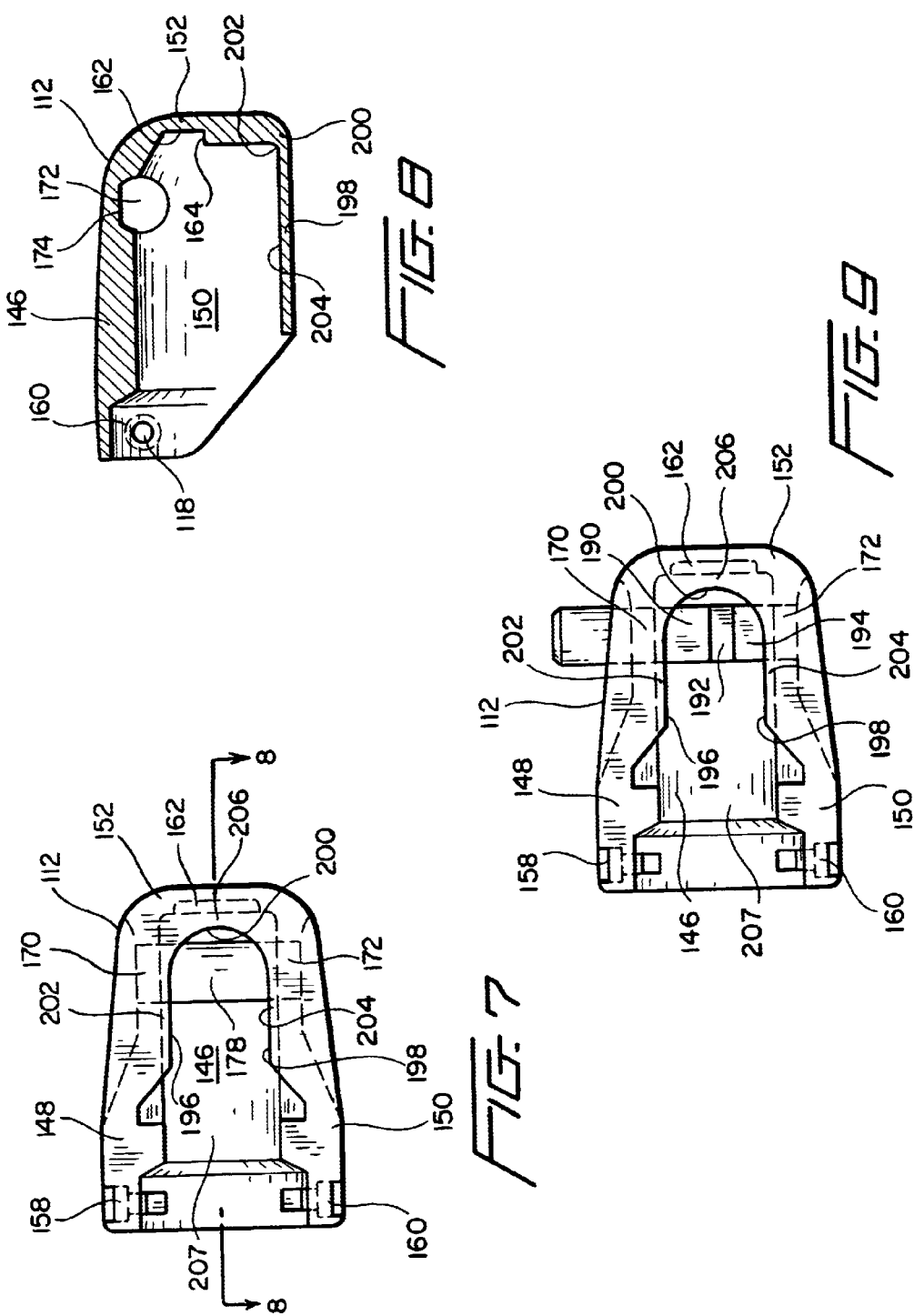

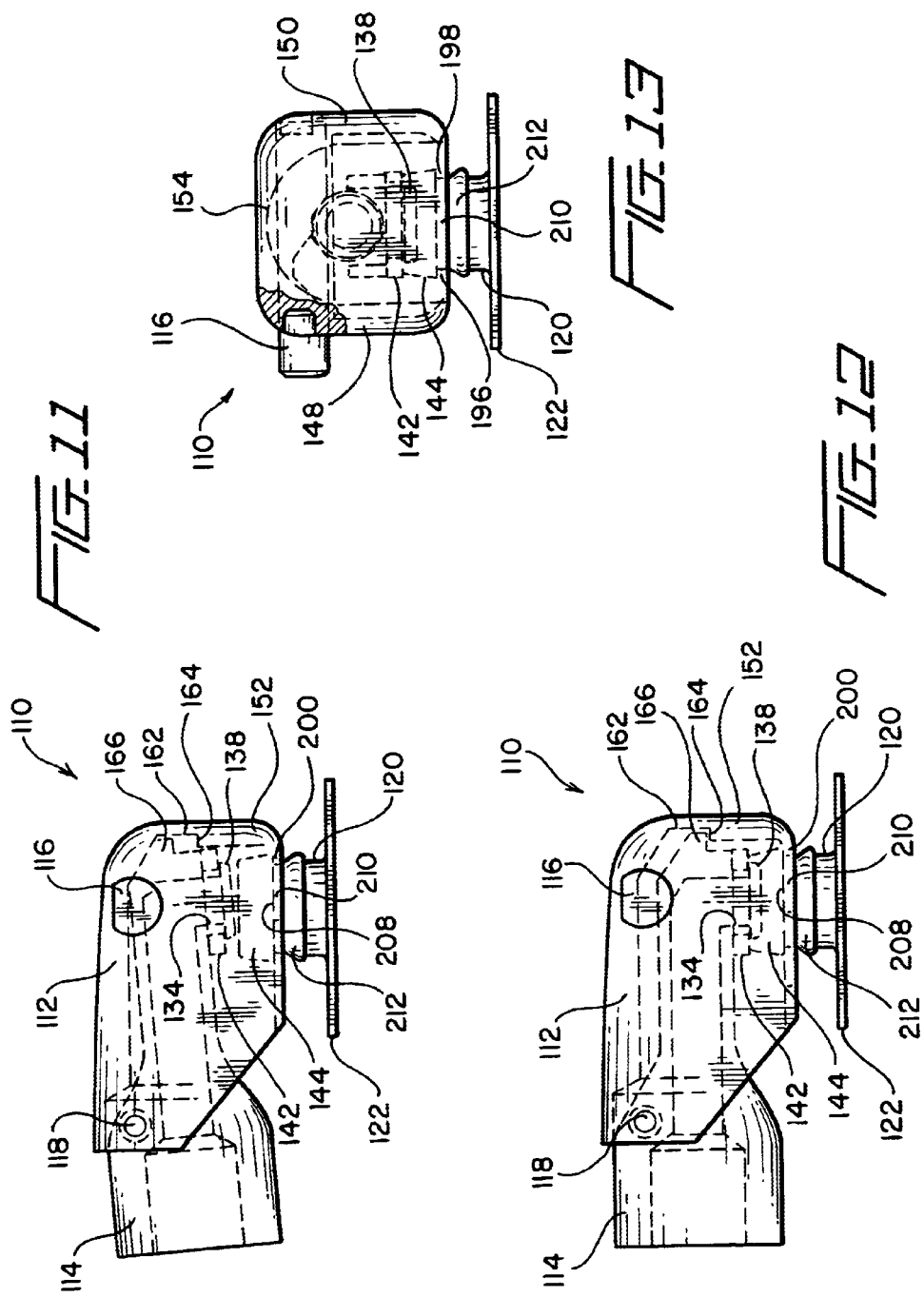

AIRBAG INFLATION NOZZLE ASSEMBLY

FIELD OF THE INVENTION

The present invention relates generally to dunnage air bags, and more particularly to a new and improved inflation nozzle fixture or assembly for inflating the inflatable bladder disposed interiorly of the dunnage air bag in connection with the use of the dunnage air bag for securing or bracing cargo within the holds of, for example, railroad cars, airplanes, ships, truck trailers, and the like.

BACKGROUND OF THE INVENTION

Cargo or dunnage air bags are used in the cargo shipment or transportation industry as a means for readily and easily securing or bracing cargo within the holds of, for example, railroad cars, ships, airplanes, truck trailers, and the like. Such dunnage or cargo air bags conventionally comprise an inflatable bladder which is enclosed within an outer bag or envelope fabricated from a plurality of paper plies. The air bags are conventionally of such construction and size as to readily enable the same to be inserted into voids or spaces defined between spaced loads, or between a particular cargo load and a side or end wall of the cargo container or hold, whereupon inflation of the air bag, the air bag will expand thereby fixedly engaging the adjacent cargo loads or the cargo load and container wall so as to secure the cargo loads against undesirable movement during transit. Obviously, in order to achieve the inflation of the cargo or dunnage air bags to a predetermined pressurized level, such air bags are also conventionally provided with an inflation valve which permits compressed or pressurized air to be conducted into the interior portion of the inflatable bladder. Typically, the inflation valve comprises a tubular valve body having a flange portion integrally fixed thereto. The flange portion is welded or heat-sealed to an interior wall portion of the inflatable bladder so as to form an air-tight seal therewith, whereas the tubular valve body projects outwardly from the air bag so as to be externally accessible for fluidic communication with a suitable air inflation fixture or assembly by means of which the compressed or pressurized air can be conducted into the interior portion of the inflatable bladder. The inflation valve also comprises a valve stem which is mounted within the tubular valve body and is movable between CLOSED and OPEN states. The valve stem is normally spring-biased toward the CLOSED state but is able to be moved to the OPEN state against the spring-biasing force by means of the air inflation fixture or assembly.

A conventional or PRIOR ART inflation nozzle or fixture, for enabling the inflation of an inflatable bladder of a cargo air bag, is disclosed within U.S. Pat. No. 5,042,541 which issued to Krier et al. on Aug. 27, 1991, however, as can be readily appreciated from FIG. 1, which corrresponds substantially to FIG. 3 of the aforenoted patent, the inflation nozzle or fixture of Krier et al. comprises a relatively large number of operative components and is relatively difficult to manipulate. More particularly, the inflation nozzle or fixture 14 is seen to comprise a tubular body portion 24 which is adapted to be threadedly connected to a hose 16 which, in turn, is adapted to be fluidically connected to a source of compressed air, not shown, wherein the tubular body portion 24 comprises an air inlet portion 34 and an air outlet portion 36 which is formed by means of a tubular nozzle tip 42. A handle 26 is pivotally mounted upon the tubular body portion 24 by means of a pivot pin 28, and a coil spring 30 is interposed between the handle 26 and the tubular body portion 24 so as to normally bias the handle 26 toward a position at which the forward end 32 of the handle 26 is moved toward the air outlet 36 of the tubular body portion 24. The forward end 32 of the handle 26 also comprises a recessed or cut-out region or portion 44 which is bounded by side walls or guides 46, and a closure plate 48 is adapted to slide over the recessed portion 44 so as to normally cover the air outlet 36. The closure plate 48 is movably mounted within the handle 26 by means of a pin and slot mechanism 50,52, and a coil spring 54 normally biases the closure plate 48 toward the forward end 32 of the handle 26.

The air bag inflation valve 12 comprises a tubular valve body 56 which extends through the wall 58 of the air bag 10, and an annular flange 60 which is sealed to the interior wall portion of the plastic bladder 62. An annular valve seat 64 is disposed interiorly of the bladder 62, and the tubular valve body 56 projects outwardly from the air bag 10 such that a first annular edge portion 66 of the valve body 56 engages an outer surface portion of the air bag 10 so as to cooperate with the flange portion 60 in securing the inflation valve 12 upon the air bag 10. The inflation valve 12 further comprises an axially movable valve stem 70 which includes an annular closure plate 72 comprising an annular ridge portion 74 for cooperating with the annular valve seat 64. A coil spring 76 normally biases the valve stem 70 to its CLOSED position at which the annular ridge portion 74 is engaged with the valve seat 64, while alternatively, the valve stem 70 is movable to its OPENED position, against the biasing force of the coil spring 76, when the nozzle tip 42 engages the end 78 of the valve stem 70 which is disposed opposite the closure plate 72.

In use, an operator grasps the inflation fixture or mechanism 14 and upon squeezing the handle 26, the handle 26 will pivot around pivot pin 28 such that the forward end 32 of the handle 26 and the closure plate 48 will move away from the nozzle tip 42. The inflation nozzle 14 is then slid or moved upwardly and transversely with respect to the axis of the inflation valve 12 such that the free end 80 of the valve body 56 moves past the nozzle tip 42, effectively enters the recessed portion or cut-out region 44 of the handle 26, and engages the closure plate 48 of the handle 26 so as to move the same downwardly against the biasing force of the spring 54 while the side walls 46 of the handle 26 are secured behind a second annular edge portion 68 of the valve body 56. Upon release of the hand pressure of the operator which initially achieved squeezing of the handle 26, spring 30 effectively causes the main body 24 to pivot away from the handle 26 whereby the nozzle tip 42 engages the end 78 of the valve stem 70 so as to move the valve stem 70 to its OPENED position against the biasing force of spring 76. Inflation of the air bag 10 can then be achieved.

While the aforenoted and briefly described inflation fixture or assembly 14 is operatively viable and reliable, and has accordingly been commercially successful, it is relatively costly to manufacture due to the relatively large number of component parts. In addition, it is noted that the operative mating of the inflation fixture or assembly 14 with the air bag inflation valve 12 is sometimes relatively difficult to achieve because there is no positional limit or stop effectively positioning the free end portion 80 of the valve body 56 at the proper position with respect to the nozzle tip 42 so as to permit the nozzle tip 42 to freely enter the free end portion 80 of the valve body 56 and thereby engage the end portion 78 of the valve stem 70. If the nozzle tip 42 is not properly coaxially aligned with the free end portion 80 of the valve body 56, then a peripheral portion of the nozzle tip 42 will engage a peripheral portion of the free end portion 80 of the valve body 56, the nozzle tip 42 will not be properly positioned within the free end portion 80 of the valve body 56 so as to properly engage the end portion 78 of the valve stem 70, and just as importantly, the inflation fixture or assembly 14 will not be securely seated or affixed upon the valve body 56 whereby proper inflation of the airbag will not be able to be readily achieved.

A need therefore exists in the art for a new and improved airbag inflation nozzle fixture or assembly which not only comprises a relatively small number of component parts so as to render the same relatively inexpensive to manufacture and relatively easy to manipulate and use, but in addition, the new and improved airbag inflation nozzle fixture or assembly will have improved structure integrally incorporated therein for automatically and consistently positionally locating the valve body within or relative to the airbag inflation nozzle fixture or assembly when the inflation nozzle fixture or assembly and the valve body are operatively engaged with each other so as to always ensure the coaxial alignment of the nozzle tip with the valve body, and for causing the nozzle tip of the inflation nozzle fixture or assembly to be lockingly engaged with the valve body so as to in turn cause the nozzle tip to engage the free end portion of the valve stem whereby the inflation valve can be disposed in its OPENED state.

OBJECTS OF THE INVENTION

Accordingly, it is an object of the present invention to provide a new and improved airbag inflation nozzle fixture or assembly.

Another object of the present invention is to provide a new and improved airbag inflation nozzle fixture or assembly which overcomes the various economic and operational drawbacks and disadvantages characteristic of PRIOR ART airbag inflation nozzle fixtures or assemblies.

An additional object of the present invention is to provide a new and improved airbag inflation nozzle fixture or assembly which comprises a relatively small number of operational components so as to render the airbag inflation nozzle fixture or assembly relatively inexpensive to manufacture and relatively easy to manipulate and use.

A further object of the present invention is to provide a new and improved airbag inflation nozzle fixture or assembly which will have improved structure integrally incorporated therein for automatically and consistently positionally locating the valve body within or relative to the airbag inflation nozzle fixture or assembly when the inflation nozzle fixture or assembly and the valve body are operatively engaged with each other so as to always ensure the coaxial alignment of the nozzle tip with the valve body.

A last object of the present invention is to provide a new and improved airbag inflation nozzle fixture or assembly which will have improved structure integrally incorporated therein for automatically and consistently positionally locating the valve body within or relative to the airbag inflation nozzle fixture or assembly when the inflation nozzle fixture or assembly and the valve body are operatively engaged with each other so as to always ensure the coaxial alignment of the nozzle tip with the valve body, and for causing the nozzle tip of the inflation nozzle fixture or assembly to be lockingly engaged with the valve body so as to in turn cause the nozzle tip to engage the free end portion of the valve stem whereby the inflation valve can be disposed in its OPENED state.

SUMMARY OF THE INVENTION

The foregoing and other objectives are achieved in accordance with the teachings and principles of the present invention through the provision of a new and improved airbag inflation nozzle fixture or assembly which comprises an inflation nozzle housing within which an airbag inflation nozzle member is pivotally mounted. The inflation nozzle housing comprises a pair of oppositely disposed side walls and an end wall integrally interconnecting the pair of side walls, and a substantially U-shaped track and rail structure is integrally provided upon the lowermost portions of the side walls and end wall so as to permit an annular edge or flanged portion of an airbag inflation valve body to effectively move therealong when the inflation nozzle housing is being mounted upon the inflation valve body. The inflation nozzle member comprises an inflation nozzle tip, and the end wall of the inflation nozzle housing serves as a stop member for limiting the relative movement of the inflation valve body into the inflation nozzle housing so as to always ensure proper coaxial alignment of the inflation nozzle tip and the inflation valve body, an inflation valve stem being axially movable within the inflation valve body between OPENED and CLOSED positions. The inflation nozzle housing is further provided with a camming lock button which is movable in a transverse direction, with respect to the axes of the inflation nozzle tip and the inflation valve body, between UNLOCKED and LOCKED positions. Accordingly, when the inflation nozzle housing is mounted upon the inflation valve body such that the inflation valve body is effectively fully inserted within the inflation nozzle housing at its proper, coaxially aligned position with respect to the inflation nozzle tip, the camming lock button is moved from its UNLOCKED position to its LOCKED position at which position the camming lock button engages the inflation nozzle member so as to pivot the same slightly and forcefully insert the inflation nozzle tip into the inflation valve body and thereby engage the inflation valve stem whereby the inflation valve stem is moved to its OPENED position. The inflation nozzle assembly, comprising the inflation nozzle housing and the inflation nozzle member, is now disposed in a LOCKED position upon the inflation valve body whereby inflation of the airbag can be readily, easily, and properly achieved.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 4 is a bottom plan view of the airbag inflation nozzle member of the new and improved airbag inflation nozzle assembly of the present invention as disclosed within FIGS. 2 and 3;

FIG. 5 is a cross-sectional view of the airbag inflation nozzle member as disclosed within FIG. 4 and as taken along the lines 5—5 of FIG. 4;

FIG. 6 is an end elevational view of the airbag inflation nozzle member as disclosed within FIGS. 4 and 5;

FIG. 7 is a bottom plan view of the airbag inflation nozzle housing of the new and improved airbag inflation nozzle assembly of the present invention as disclosed within FIGS. 2 and 3;

FIG. 8 is a cross-sectional view of the airbag inflation nozzle housing as disclosed within FIG. 7 and as taken along the lines 8—8 of FIG. 7;

FIG. 9 is a bottom plan view, similar to that of FIG. 7 showing, however, the airbag inflation nozzle housing having the camming locking button mounted therein and disposed at its LOCKED position;

FIG. 10 is a side elevational view of the camming locking button which is adapted to be movably mounted upon the airbag inflation nozzle housing, as disclosed within FIG. 9, between a first UNLOCKED position at which the nozzle tip portion of the inflation nozzle member is pivotally disposed within the inflation nozzle housing so as to permit the inflation nozzle assembly to be mounted upon or removed from an airbag inflation valve body, and a LOCKED position at which the nozzle tip portion of the inflation nozzle member is fixedly disposed within the inflation nozzle housing so as to properly engage the free end portion of the airbag inflation valve body and the inflation valve stem thereof in preparation for an airbag inflation operation;

FIG. 11 is a schematic, side elevational view of the new and improved airbag inflation nozzle assembly showing the disposition of the cooperative parts thereof as the airbag inflation nozzle assembly is being mounted upon the free end portion of the airbag inflation valve body wherein the camming locking button is disposed at its UNLOCKED position;

FIG. 12 is a schematic, side elevational view, corresponding to that of FIG. 11, of the new and improved airbag inflation nozzle assembly showing the disposition of the cooperative parts thereof when the airbag inflation nozzle assembly has been mounted upon the free end portion of the airbag inflation valve body and wherein the camming locking button is disposed at its LOCKED position; and FIG. 13 is an end elevational view, corresponding to that of FIG. 12, of the new and improved airbag inflation nozzle assembly clearly showing the disposition of the cooperative parts thereof when the airbag inflation nozzle assembly has been mounted upon the free end portion of the airbag inflation valve body and wherein the camming locking button is disposed at its LOCKED position.

DETAILED DESCRIPTION OF THE PREFERRED EMBODIMENT

Figure 2:
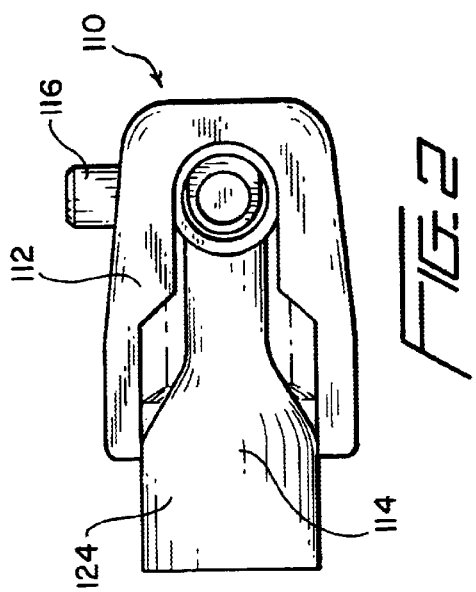
FIG. 2 is a bottom plan view of the new and improved airbag inflation nozzle assembly constructed in accordance with the principles and teachings of the present invention and showing the cooperative parts thereof.
Figure 3:
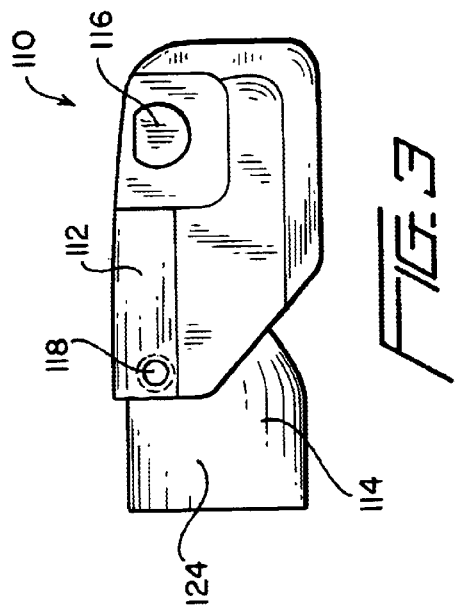
FIG. 3 is a side elevational view of the new and improved airbag inflation nozzle assembly of the present invention corresponding to the airbag inflation nozzle assembly as disclosed within FIG. 2.
Figure 1:
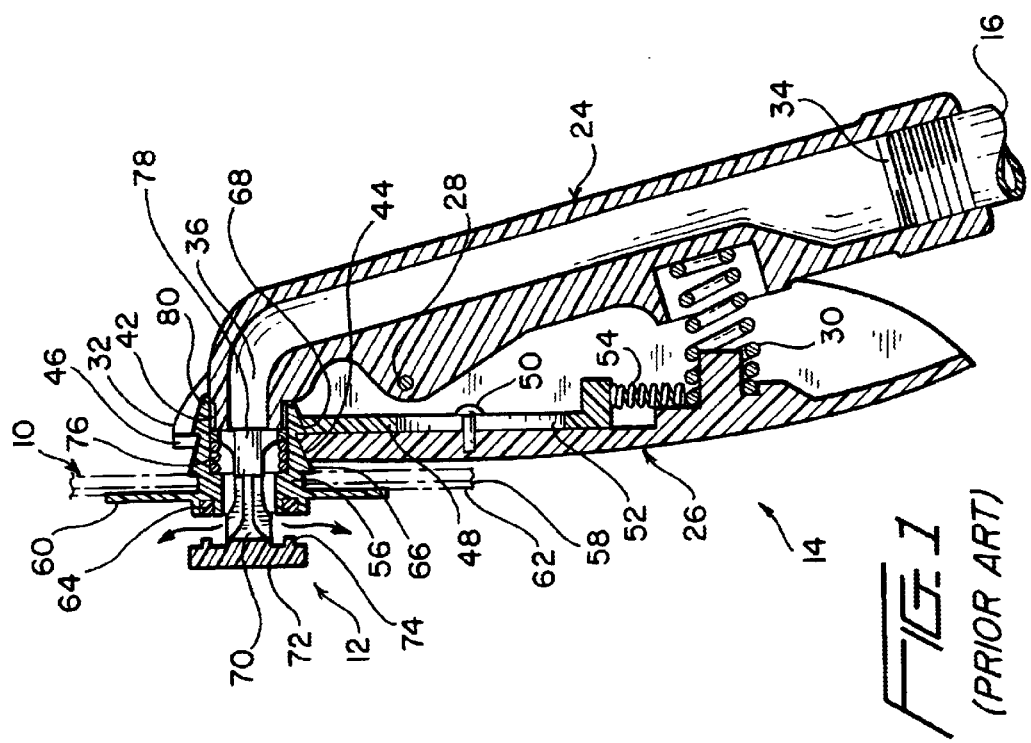
FIG. 1 is a cross-sectional view of a conventional PRIOR ART airbag inflation nozzle and handle assembly for use in conjunction with the inflation of an inflatable cargo airbag.

Referring now to the drawings, and more particularly to FIGS. 2 and 3 thereof, the new and improved airbag inflation nozzle assembly, which has been constructed in accordance with the teachings and principles of the present invention, is disclosed and is generally indicated by the reference character 110. The airbag inflation nozzle assembly 110 is relatively simple in structure in that the same substantially comprises only three operative components comprising an airbag inflation assembly housing 112, an airbag inflation assembly nozzle member 114, and a camming locking button 116. The nozzle member 114 is adapted to be mounted upon the housing 112 by means of a pivot pin 118 such that, as will become more apparent hereinafter, when the nozzle member 114 is mounted upon the housing 112, the nozzle member 114 can undergo or experience limited pivotal movement relative to the housing 112 between a first DISENGAGED and UNLOCKED position with respect to the tubular inflation valve body member 120 of an airbag inflation valve assembly 122, as disclosed within FIG. 11, and a second ENGAGED and LOCKED position with respect to the tubular inflation valve body member 120 of the airbag inflation valve assembly 122, as disclosed within FIGS. 12 and 13, so as to move the valve stem portion, not shown, of the inflation valve assembly 122 to an OPENED position and thereby enable inflation of the cargo airbag to which the inflation valve assembly 122 is operatively connected.

With additional reference now being made to FIGS. 4 and 5, the details of the airbag inflation nozzle member 114 will be disclosed. More particularly, it is seen that the airbag inflation nozzle member 114 comprises a first enlarged tubular end portion 124 which is internally tapped or threaded as at 126 so as to facilitate the threaded attachment of an air hose, not shown, thereto by means of which a supply of compressed air can be transmitted to the airbag inflation nozzle member 114 for ultimate transmission to the airbag inflation valve assembly 122. Tubular end portion 124 of nozzle member 114 is fluidically connected to a fluid passageway 128 which is coaxially oriented with respect to the tubular end portion 124, and it is seen that the fluid passageway 128 extends axially through an elongated body portion 130 of the nozzle member 114. The axial fluid passageway 128 is, in turn, fluidically connected to a transversely or radially oriented fluid passageway 132 which is defined within a nozzle tip portion 134 of the nozzle member 114. The nozzle tip portion 134 comprises an annularly recessed portion 136 defined between an annular flanged distal end portion 138 and a shoulder portion 140, and an O-ring seal member 142, as seen in FIGS. 11–13, is adapted to be captured between the flanged distal end portion 138 and the shoulder portion 140 so as to be seated within the annularly recessed portion 136. It is to be noted, as may best be appreciated from FIG. 12, that the diametrical extent of the flanged distal end portion 138 of the nozzle tip portion 134 is less than the diametrical extent of the tubular distal end portion 144 of the tubular inflation valve body member 120 of the airbag inflation valve assembly 122. In this manner, when the nozzle member 114 is pivoted about pivot pin 118 so as to be disposed at its ENGAGED position with respect to the tubular inflation valve body member 120 of the airbag inflation valve assembly 122, the distal end portion 138 of the nozzle tip portion 134 will be disposed internally within the distal end portion 144 of the valve body member 120 so as to actuate the valve stem member, not shown, of the valve assembly 122, while the O-ring member 142 will be seated upon the external periphery of the distal end portion 144 of the valve body member 120.

With reference now being additionally made to FIGS. 7–9, it is seen that the airbag inflation assembly housing 112 comprises an upper wall 146, a pair of oppositely disposed side walls 148,150 integral with the upper wall 146, and a front end wall 152 integral with the upper wall 146 and the pair of oppositely disposed side walls 148,150. It is thus apparent that the bottom section of the assembly housing 112, disposed opposite the upper wall 146, as well as the rear end portion of the assembly housing 112, disposed opposite the front end wall 152, are open so as to permit the insertion therewithin of the airbag inflation assembly nozzle member 114. More particularly, it is additionally seen that an arcuately recessed portion 154 is defined within the rear end portion of the upper wall 146 and the upper end portions of each one of the oppositely disposed side walls 148,150, as best seen in, or appreciated from, FIG. 13, so as to effectively provide a seat for the enlarged tubular end portion 124 of the nozzle member 114, as best seen in FIGS. 11 and 12, when the nozzle member 114 is mounted within the assembly housing 112 and, in particular, when the nozzle member 114 is moved to, and disposed at, its LOCKED and ENGAGED position with respect to the valve body member 120 of the airbag inflation valve assembly 122.

In connection with the mounting or disposition of the nozzle member 114 within the housing 112, it is also appreciated that the forward region of the enlarged tubular end portion 124 of the nozzle member 114 is provided with a through-bore 156 as best seen in FIGS. 4 and 5, and that each one of the side walls 148,150 of the housing 112 is respectively provided with a through-bore 158,160. Through-bores 158,160 are adapted to be coaxially aligned with the through-bore 156 of the nozzle member 114, and in this manner, when the pivot pin 118 is inserted through and secured within the side walls 148,150 of the housing 112, the nozzle member 114 is pivotally mounted within the housing 112 so as to be movable between its aforenoted first DISENGAGED and UNLOCKED position, and its second ENGAGED and LOCKED position. As can be additionally appreciated from FIGS. 7–9, as well as FIGS. 11 and 12, it is further seen that a substantially rectangularly configured recessed region 162 is defined within the front end wall 152 of the airbag inflation assembly housing 112, and accordingly, a shoulder portion 164 is provided within the front end wall 152. As can best be seen from FIGS. 4 and 5, as well as FIGS. 11 and 12, the forward end section 166 of the elongated body portion 130 of the nozzle member 114 protrudes or extends beyond that section of the nozzle tip portion 134 within which the shoulder portion 140 is provided so as to define a lug 168 which is adapted to engage and be seated upon shoulder portion 164 of recessed region 162 of the housing 112 when the nozzle member 114 is moved downwardly from its DISENGAGED and UNLOCKED position as shown in FIG. 11 to its ENGAGED and LOCKED position as shown in FIG. 12. In this manner, the nozzle member 114 is fixedly retained at its ENGAGED and LOCKED position with respect to the valve body member 120 of the inflation valve assembly 122, and in particular with respect to the distal end portion 144 of the valve body member 120, so as to ensure proper actuation of the valve stem member, not shown, of the valve assembly 122 and the subsequent inflation of the airbag.

In order to in fact achieve the pivotal movement of the nozzle member 114 from its DISENGAGED and UNLOCKED position to its ENGAGED and LOCKED position with respect to the valve body member 120 of the inflation valve assembly 122, and furthermore, in order to fixedly retain the nozzle member 114 at its ENGAGED and LOCKED position with respect to the valve body member 120 of the inflation valve assembly 122, the airbag inflation nozzle assembly 110 of the present invention is provided with the unique and novel structure comprising the aforenoted camming locking button 116 which is shown in detail in FIG. 10. As can best be appreciated from FIGS. 7–9, the side walls 148,150 of the housing 112 are respectively provided with through-bores 170,172 through which opposite ends of the camming locking button 116 are adapted to be movably disposed. The through-bores 170,172 have substantially circular configurations, except that the uppermost portion of each through-bore 170,172 has a flattened or planar section, as shown, for example, at 174 in FIG. 8 in connection with through-bore 172.

The camming locking button 116 has a similar, substantially circular cross-sectional configuration, except that the uppermost portion of the camming locking button 116 is likewise flattened or planar as indicated at 176 in FIG. 10. The flattened or planar sections of through-bores 170,172 accordingly match and accommodate the similarly flattened or planar uppermost section 176 of the camming locking button 116, and in this manner, rotational movement of the camming locking button 116 is effectively prevented such that movement of the camming locking button 116 within the through-bores 170,172, and between the UNLOCKED and LOCKED positions of the camming locking button 116, is solely reciprocal and linear. It is further noted, as best seen in FIG. 7, that the upper wall 146 of the housing 112 is also provided with a planar, recessed groove 178 which in effect is a continuation of the flattened or planar sections of the through-bores 170,172 defined within the side walls 148,150 of the housing 112, and in this manner, the camming locking button 116 is linearly guided during its reciprocal movements between the UNLOCKED and LOCKED positions.

Continuing further, in order to achieve the UNLOCKED and LOCKED states or positions of the camming locking button 116 with respect to the elongated body portion 130 of the nozzle member 114, and in turn, in order to achieve the UNLOCKED and LOCKED states or positions of the elongated body portion 130 of the nozzle member 114, and in particular the nozzle tip portion 134 thereof, with respect to the tubular inflation valve body member 120 of the airbag inflation valve assembly 122, the upper forward surface section of the elongated body portion 130 of the nozzle member 114 is seen to comprise, as best seen in FIG. 6, an uppermost, horizontally disposed planar surface section 180 and a pair of downwardly inclined surface sections 182,184 disposed upon opposite sides of the planar surface section 180. In a similar manner, as can best be appreciated from FIG. 10, the undersurface portion of the camming locking button 116 is provided with a vertically stepped recessed region comprising a first upper, horizontally disposed planar surface section 186 and a pair of downwardly inclined surface sections 188,190 disposed upon opposite sides of the first upper planar surface section 186. The undersurface recessed portion of the camming locking button 116 is also provided with a second lower, horizontally disposed planar surface 192, and a third downwardly inclined surface section 194. It can therefore be readily appreciated that when the camming locking button 116 is linearly moved toward the right as seen in FIG. 10 and in accordance with the arrow designated UNLOCKED such that the camming locking button 116 is effectively disposed at its UNLOCKED position with respect to the nozzle member 114, the planar and inclined surface sections 180,182, and 184 of the nozzle member 114 will be accommodated within the recessed undersurface region of the camming locking button 116 as defined by the corresponding planar and inclined surface sections 186,188, and 190 whereby the nozzle member 114 is free to achieve its pivoted UNLOCKED and DISENGAGED state with respect to the valve body member 120 of the inflation valve assembly 122 as can be seen in FIG. 11.

When, however, the camming locking button 116 is linearly moved toward the left as seen in FIG. 10 and in accordance with the arrow designated LOCKED such that the camming locking button 116 is effectively disposed at its LOCKED position with respect to the nozzle member 114, the inclined surface section 190 will forcefully engage the inclined surface section 184 of the nozzle member 114 and cause the same to effectively move downwardly along the inclined surface section 190 of the camming locking button 116 until the second lower, horizontally disposed planar surface 192 can be disposed atop the upper planar surface section 180 of the nozzle member 114 and the third inclined surface section 194 of the camming locking button 116 is disposed in engaged contact with the inclined surface section 184 of the nozzle member 114 as can also be appreciated from FIG. 13. As a result of such transverse linear movement of the camming locking button 116, the nozzle member 114 has now been pivotally moved downwardly from its UNLOCKED and DISENGAGED state with respect to the valve body member 120 of the inflation valve assembly 122 as shown in FIG. 11 to its LOCKED and ENGAGED state with respect to the valve body member 120 of the inflation valve assembly 122 as shown in FIG. 12 whereby inflation of the inflatable airbag can be achieved. It is to be noted that when the camming locking button 116 is moved from its UNLOCKED position to its LOCKED position, and as a result of the aforenoted engagement of the second lower, horizontally disposed planar surface 192 with the upper planar surface section 180 of the nozzle member 114, as well as the engagement of the third inclined surface section 194 of the camming locking button 116 with the inclined surface section 184 of the nozzle member 114, not only can the operator personnel visually see that the camming locking button 116 has been moved from its UNLOCKED position to its LOCKED position as a result of opposite end portions of the camming locking button 116 projecting outwardly from the opposite side walls 148,150 of the housing 112 depending upon the disposition of the camming locking button 116 at its UNLOCKED and LOCKED positions, but in addition, the operator can also hear an audible click or snap-engagement sound as well as sense the attainment of the LOCKED state of the camming locking button 116 in a tactile sense.

A last significant feature of the airbag inflation assembly 110 as constructed in accordance with the teachings and principles of the present invention resides in the provision of structure therewithin for automatically achieving the proper disposition or positioning of the airbag inflation housing 112 and the airbag inflation nozzle member 114 with respect or relative to the valve body member 120 of the inflation valve assembly 122 when the airbag inflation nozzle assembly 110 is being mounted upon the valve body member 120 of the inflation valve assembly 122 so as to always ensure coaxial alignment of the airbag inflation nozzle member 114 with respect to the valve body member 120 of the inflation valve assembly 122 and the consequent proper inflation of the airbag. More particularly, as can best be appreciated from FIGS. 7–9, each one of the side walls 148,150 of the housing 112 is provided, at its lowermost end portion, with a transversely inwardly extending flanged portion 196,198, and in a similar manner, the end wall 152 is provided, at its lowermost end portion, with an axially inwardly extending flanged portion 200 wherein the flanged portions 196, 198, 200 are continuous and integral with each other so as to effectively define a substantially U-shaped ledge having side ledge portions 202,204, and an end ledge portion 206.

It can therefore be appreciated that when the airbag inflation nozzle assembly 110 is being mounted upon the valve body member 120 of the inflation valve assembly 122, the side walls 148,150 of the housing 112 effectively define an open-ended slot 207 within which the valve body member 120 can be inserted and the ledge portions 202,204 will effectively serve as rail members upon which the lower annular edge portion 208 of the distal end portion 144 of the tubular inflation valve body member 120 will ride. As best seen in FIGS. 11–13, an annularly recessed region 210 is also defined between the distal end portion 144 of the valve body member 120 and a second flanged portion 212 of valve body member 120 which is adapted to engage the external surface of the inflatable airbag, not shown, when valve body member 120 is mounted upon the airbag. In this manner, when the end flanged portion 200 encounters the annularly recessed region 210 of the valve body member 120, not only will the lower annular edge portion 208 of the distal end portion 144 of the valve body member 120 be disposed upon the end ledge portion 206, but in addition, the relative movement of the airbag inflation assembly housing 112 will effectively be arrested whereby the nozzle tip portion 134 will be properly coaxially aligned with respect to the valve body member 120 such that the nozzle tip portion 134 can be disposed internally within the distal end portion 144 of the valve body member 120 and thereby actuate the valve stem, not shown, of the inflation valve assembly 122 to it OPENED position. As is also best seen, for example, from FIG. 12, when the nozzle tip portion 134 is disposed internally within the distal end portion 144 of the valve body member 120 so as to actuate the valve stem, not shown, of the inflation valve assembly 122, the O-ring member 142 will be seated upon the external periphery of the distal end portion 144 of valve body member 120 in a somewhat compressed state so as to achieve its desired tight sealing function.

Thus, it may be seen that in accordance with the teachings and principles of the present invention, a relatively simple airbag inflation nozzle assembly has been developed and constructed wherein the inflation nozzle assembly is easy to manipulate and use, wherein the inflation nozzle assembly is easy to mount upon the inflation valve assembly of the airbag to be inflated, wherein the inflation nozzle assembly comprises structure for always ensuring that the nozzle tip portion will be properly coaxially aligned with respect to the inflation valve assembly upon the airbag so as to properly actuate the valve stem component thereof and thereby achieve inflation of the airbag, and wherein the inflation nozzle assembly can be easily disposed within UNLOCKED and LOCKED states with respect to the inflation valve body member of the inflation valve assembly. It is further noted that as a result of the provision of the camming locking button upon the housing for easily achieving the UNLOCKED and LOCKED states, the operator personnel are also readily provided with visual, audible, and tactile means for indicating the achievement of the LOCKED state of the assembly.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. An inflation nozzle assembly for inflating an article having an inflation valve mounted thereon, comprising:

a housing;

an air inflation nozzle having a first end portion adapted for connection to a source of compressed air so as to receive a supply of compressed air from the source of compressed air, and a second end portion comprising a nozzle tip for mating with an inflation valve mounted upon an article to be inflated;

first means movably mounting said air inflation nozzle upon said housing between a first position at which said air inflation nozzle will be fluidically disengaged from the inflation valve mounted upon the article to be inflated such that the article to be inflated cannot be inflated by compressed air from the source of compressed air, and a second position at which said inflation nozzle will be fluidically engaged with the inflation valve mounted upon the article to be inflated such that the article to be inflated can be inflated by compressed air from the source of compressed air; and second means movably mounted upon said housing between a first position at which said second means permits said air inflation nozzle to be disposed at said first position at which said air inflation nozzle will be fluidically disengaged from the inflation valve mounted upon the article to be inflated such that the article to be inflated cannot be inflated by compressed air from the source of compressed air, and a second position at which said second means causes said air inflation nozzle to attain said second position at which said inflation nozzle will be fluidically engaged with the inflation valve mounted upon the article to be inflated such that the article to be inflated can be inflated by compressed air from the source of compressed air.

2. The assembly as set forth in claim 1, wherein:

said first means movably mounting said air inflation nozzle upon said housing between said first position, at which said air inflation nozzle will be fluidically disengaged from the inflation valve mounted upon the article to be inflated, and said second position, at which said inflation nozzle will be fluidically engaged with the inflation valve mounted upon the article to be inflated, comprises a pivot pin for pivotally mounting said air inflation nozzle upon said housing.

3. The assembly as set forth in claim 2, wherein:

said second means movably mounted upon said housing between said first position at which said second means permits said air inflation nozzle to be disposed at said first position at which said air inflation nozzle will be fluidically disengaged from the inflation valve mounted upon the article to be inflated, and said second position at which said second means causes said air inflation nozzle to attain said second position at which said inflation nozzle will be fluidically engaged with the inflation valve mounted upon the article to be inflated, comprises a camming button for engaging said air inflation nozzle and forcefully moving said air inflation nozzle from said first position, at which said air inflation nozzle is fluidically disengaged from the inflation valve mounted upon the article to be inflated, to said second position, at which said inflation nozzle is fluidically engaged with the inflation valve mounted upon the article to be inflated, as said camming button is moved from its first position to its second position.

4. The assembly as set forth in claim 3, wherein:

said air inflation nozzle has a longitudinal extent; and said camming button is movable transversely, with respect to said longitudinal extent of said air inflation nozzle, between said first and second positions of said camming button.

5. The assembly as set forth in claim 4, wherein:

said camming button comprises a vertically stepped recessed portion such that when said camming button is movable transversely, with respect to said longitudinal extent of said air inflation nozzle, to said first position, a first upper section of said vertically stepped recessed portion is aligned with respect to said air inflation nozzle so as to permit said air inflation nozzle to be disposed at said first position at which said air inflation nozzle is fluidically disengaged from the air inflation valve mounted upon the article to be inflated, whereas when said camming button is movable transversely, with respect to said longitudinal extent of said air inflation nozzle, to said second position, a second lower section of said vertically stepped recessed portion is aligned with respect to said air inflation nozzle so as to cause said air inflation nozzle to be disposed at said second position at which said air inflation nozzle is fluidically engaged with the air inflation valve mounted upon the article to be inflated.

6. The assembly as set forth in claim 5, wherein:

said air inflation nozzle comprises a planar surface portion and an inclined surface portion disposed upon a lateral side of said planar surface portion; and said vertically stepped recessed portion of said camming button comprises a first upper planar surface, and a first inclined surface disposed upon a lateral side of said first upper planar surface, for respectively engaging said planar surface portion and said inclined surface portion of said air inflation nozzle when said camming button is disposed at said first position, and a second lower planar surface, and a second inclined surface disposed upon a lateral side of said second lower planar surface, for respectively engaging said planar surface portion and said inclined surface portion of said air inflation nozzle when said camming button is disposed at said second position.

7. The assembly as set forth in claim 4, wherein:

said camming button comprises a vertically stepped recessed portion such that when said camming button is movable transversely, with respect to said longitudinal extent of said air inflation nozzle, to said first position, a first upper section of said vertically stepped recessed portion is aligned with respect to said air inflation nozzle so as to permit said air inflation nozzle to be disposed at said first position at which said air inflation nozzle is fluidically disengaged from the air inflation valve mounted upon the inflatable airbag, whereas when said camming button is movable transversely, with respect to said longitudinal extent of said air inflation nozzle, to said second position, a second lower section of said vertically stepped recessed portion is aligned with respect to said air inflation nozzle so as to cause said air inflation nozzle to be disposed at said second position at which said air inflation nozzle is fluidically engaged with the air inflation valve mounted upon the inflatable airbag.

8. The assembly as set forth in claim 7, wherein:

said air inflation nozzle comprises a planar surface portion and an inclined surface portion disposed upon a lateral side of said planar surface portion; and said vertically stepped recessed portion of said camming button comprises a first upper planar surface, and a first inclined surface disposed upon a lateral side of said first upper planar surface, for respectively engaging said planar surface portion and said inclined surface portion of said air inflation nozzle when said camming button is disposed at said first position, and a second lower planar surface, and a second inclined surface disposed upon a lateral side of said second lower planar surface, for respectively engaging said planar surface portion and said inclined surface portion of said air inflation nozzle when said camming button is disposed at said second position.

9. The assembly as set forth in claim 1, wherein:

said housing comprises a pair of oppositely disposed side walls, and an end wall;

said pair of oppositely disposed side walls comprise first and second flanged portions defining a pair of oppositely disposed rail members upon which the inflation valve can be movably supported when said air inflation nozzle assembly is operatively mated with the inflation valve; and said end wall comprises a third flanged portion for engaging the inflation valve as said air inflation nozzle assembly is operatively mated with the inflation valve so as to coaxially align the inflation valve with said inflation nozzle tip and thereby ensure proper inflation of the article to be inflated.

10. An inflation nozzle assembly for inflating an inflatable cargo airbag having an inflation valve mounted thereon, comprising:

a housing;

an air inflation nozzle having a first end portion adapted for connection to a source of compressed air so as to receive a supply of compressed air from the source of compressed air, and a second end portion comprising a nozzle tip for mating with an inflation valve mounted upon an inflatable cargo airbag to be inflated;

first means movably mounting said air inflation nozzle upon said housing between a first position at which said air inflation nozzle will be fluidically disengaged from the inflation valve mounted upon the inflatable airbag such that the inflatable airbag cannot be inflated by compressed air from the source of compressed air, and a second position at which said inflation nozzle will be fluidically engaged with the inflation valve mounted upon the inflatable airbag such that the inflatable airbag can be inflated by compressed air from the source of compressed air; and second means movably mounted upon said housing between a first position at which said second means permits said air inflation nozzle to be disposed at said first position at which said air inflation nozzle will be fluidically disengaged from the inflation valve mounted upon the inflatable airbag such that the inflatable airbag cannot be inflated by compressed air from the source of compressed air, and a second position at which said second means causes said air inflation nozzle to attain said second position at which said inflation nozzle will be fluidically engaged with the inflation valve mounted upon the inflatable airbag such that the inflatable airbag can be inflated by compressed air from the source of compressed air.

11. The assembly as set forth in claim 10, wherein:

said first means movably mounting said air inflation nozzle upon said housing between said first position, at which said air inflation nozzle will be fluidically disengaged from the inflation valve mounted upon the inflatable airbag, and said second position, at which said inflation nozzle will be fluidically engaged with the inflation valve mounted upon the inflatable airbag, comprises a pivot pin for pivotally mounting said air inflation nozzle upon said housing.

12. The assembly as set forth in claim 11, wherein:

said second means movably mounted upon said housing between said first position at which said second means permits said air inflation nozzle to be disposed at said first position at which said air inflation nozzle will be fluidically disengaged from the inflation valve mounted upon the inflatable airbag, and said second position at which said second means causes said air inflation nozzle to attain said second position at which said inflation nozzle will be fluidically engaged with the inflation valve mounted upon the inflatable airbag, comprises a camming button for engaging said air inflation nozzle and forcefully moving said air inflation nozzle from said first position, at which said air inflation nozzle is fluidically disengaged from the inflation valve mounted upon the inflatable airbag, to said second position, at which said inflation nozzle is fluidically engaged with the inflation valve mounted upon the inflatable airbag, as said camming button is moved from its first position to its second position.

13. The assembly as set forth in claim 12, wherein:

said air inflation nozzle has a longitudinal extent; and said camming button is movable transversely, with respect to said longitudinal extent of said air inflation nozzle, between said first and second positions of said camming button.

14. The assembly as set forth in claim 10, wherein:

said housing comprises a pair of oppositely disposed side walls, and an end wall;

said pair of oppositely disposed side walls comprise first and second flanged portions defining a pair of oppositely disposed rail members upon which the inflation valve can be movably supported when said air inflation nozzle assembly is operatively mated with the inflation valve; and said end wall comprises a third flanged portion for engaging the inflation valve as said air inflation nozzle assembly is operatively mated with the inflation valve so as to coaxially align the inflation valve with said inflation nozzle tip and thereby ensure proper inflation of the inflatable airbag.

15. An inflation nozzle assembly for inflating an inflatable cargo airbag having an inflation valve mounted thereon, comprising:

a housing comprising a pair of oppositely disposed side walls, and an end wall;

an air inflation nozzle having a first end portion adapted for connection to a source of compressed air so as to receive a supply of compressed air from the source of compressed air, and a second end portion comprising a nozzle tip for mating with an inflation valve mounted upon an inflatable cargo airbag to be inflated;

first means movably mounting said air inflation nozzle upon said housing between a first position at which said air inflation nozzle will be fluidically disengaged from the inflation valve mounted upon the inflatable airbag such that the inflatable airbag cannot be inflated by compressed air from the source of compressed air, and a second position at which said inflation nozzle will be fluidically engaged with the inflation valve mounted upon the inflatable airbag such that the inflatable airbag can be inflated by compressed air from the source of compressed air;

second means movably mounted upon said housing between a first position at which said second means permits said air inflation nozzle to be disposed at said first position at which said air inflation nozzle will be fluidically disengaged from the inflation valve mounted upon the inflatable airbag such that the inflatable airbag cannot be inflated by compressed air from the source of compressed air, and a second position at which said second means causes said air inflation nozzle to attain said second position at which said inflation nozzle will be fluidically engaged with the inflation valve mounted upon the inflatable airbag such that the inflatable airbag can be inflated by compressed air from the source of compressed air; and a flanged portion defined upon said end wall of said housing for engaging the inflation valve as said air inflation nozzle assembly is operatively mated with the inflation valve so as to coaxially align the inflation valve with said inflation nozzle tip and thereby ensure proper inflation of the inflatable airbag.

16. The assembly as set forth in claim 15, wherein:

said first means movably mounting said air inflation nozzle upon said housing between said first position, at which said air inflation nozzle will be fluidically disengaged from the inflation valve mounted upon the inflatable airbag, and said second position, at which said inflation nozzle will be fluidically engaged with the inflation valve mounted upon the inflatable airbag, comprises a pivot pin for pivotally mounting said air inflation nozzle upon said housing.

17. The assembly as set forth in claim 16, wherein:

said second means movably mounted upon said housing between said first position at which said second means permits said air inflation nozzle to be disposed at said first position at which said air inflation nozzle will be fluidically disengaged from the inflation valve mounted upon the inflatable airbag, and said second position at which said second means causes said air inflation nozzle to attain said second position at which said inflation nozzle will be fluidically engaged with the inflation valve mounted upon the inflatable airbag, comprises a camming button for engaging said air inflation nozzle and forcefully moving said air inflation nozzle from said first position, at which said air inflation nozzle is fluidically disengaged from the inflation valve mounted upon the inflatable airbag, to said second position, at which said inflation nozzle is fluidically engaged with the inflation valve mounted upon the inflatable airbag, as said camming button is moved from its first position to its second position.

18. The assembly as set forth in claim 17, wherein:

said air inflation nozzle has a longitudinal extent; and said camming button is movable transversely, with respect to said longitudinal extent of said air inflation nozzle, between said first and second positions of said camming button.

19. The assembly as set forth in claim 18, wherein:

said camming button comprises a vertically stepped recessed portion such that when said camming button is movable transversely, with respect to said longitudinal extent of said air inflation nozzle, to said first position, a first upper section of said vertically stepped recessed portion is aligned with respect to said air inflation nozzle so as to permit said air inflation nozzle to be disposed at said first position at which said air inflation nozzle is fluidically disengaged from the air inflation valve mounted upon the inflatable airbag, whereas when said camming button is movable transversely, with respect to said longitudinal extent of said air inflation nozzle, to said second position, a second lower section of said vertically stepped recessed portion is aligned with respect to said air inflation nozzle so as to cause said air inflation nozzle to be disposed at said second position at which said air inflation nozzle is fluidically engaged with the air inflation valve mounted upon the inflatable airbag.

20. The assembly as set forth in claim 19, wherein:

said air inflation nozzle comprises a planar surface portion and an inclined surface portion disposed upon a lateral side of said planar surface portion; and said vertically stepped recessed portion of said camming button comprises a first upper planar surface, and a first inclined surface disposed upon a lateral side of said first upper planar surface, for respectively engaging said planar surface portion and said inclined surface portion of said air inflation nozzle when said camming button is disposed at said first position, and a second lower planar surface, and a second inclined surface disposed upon a lateral side of said second lower planar surface, for respectively engaging said planar surface portion and said inclined surface portion of said air inflation nozzle when said camming button is disposed at said second position.

21. The assembly as set forth in claim 15, wherein:

said pair of oppositely disposed side walls of said housing comprise second and third flanged portions defining a pair of oppositely disposed rail members upon which the inflation valve can be movably supported when said air inflation nozzle assembly is operatively mated with the inflation valve.

* * * * *